United States Patent
Pengel et al.

(10) Patent No.: US 12,240,205 B2
(45) Date of Patent: Mar. 4, 2025

(54) COMPOSITE PANE COMPRISING A SUN SHADING COATING

(71) Applicant: SAINT-GOBAIN GLASS FRANCE, Courbevoie (FR)

(72) Inventors: Stefanie Pengel, Aachen (DE); Klaus Fischer, Alsdorf (DE); Alexandra Toumar, Paris (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 18/044,175

(22) PCT Filed: Nov. 23, 2021

(86) PCT No.: PCT/EP2021/082646
§ 371 (c)(1),
(2) Date: Mar. 6, 2023

(87) PCT Pub. No.: WO2022/112231
PCT Pub. Date: Jun. 2, 2022

(65) Prior Publication Data
US 2023/0321955 A1    Oct. 12, 2023

(30) Foreign Application Priority Data
Nov. 27, 2020  (EP) .................................... 20210317

(51) Int. Cl.
*B32B 17/10* (2006.01)
(52) U.S. Cl.
CPC .. *B32B 17/10229* (2013.01); *B32B 17/10036* (2013.01); *B32B 17/10201* (2013.01);
(Continued)
(58) Field of Classification Search
CPC ...... C03C 17/3607–17/3697; B32B 17/10229; B32B 17/10761; G02B 5/282
See application file for complete search history.

(56) References Cited

U.S. PATENT DOCUMENTS 5,071,206 A * 12/1991 Hood ................ B32B 17/10761
    204/192.27
5,595,825 A *  1/1997 Guiselin ............. C03C 17/3681
    428/428
(Continued)

FOREIGN PATENT DOCUMENTS

DE           199 27 683 C1   1/2001
DE      20 2020 100793 U1    2/2020
(Continued)

OTHER PUBLICATIONS

Bright et al. "Infrared optical properties of amorphous and nanocrystalline Ta2O5 thin films", Journal of Applied Physics, 114, (2013); p. 083515-1 to 083515-10.*
(Continued)

*Primary Examiner* — Prashant J Khatri
(74) *Attorney, Agent, or Firm* — Pillsbury Winthrop Shaw Pittman LLP (57) ABSTRACT

A composite pane includes an outer pane having an exterior-side surface and an interior-side surface, an inner pane having an exterior-side surface and an interior-side surface, and a thermoplastic intermediate layer joining the interior-side surface of the outer pane to the exterior-side surface of the inner pane. The composite pane has a sun shading coating between the outer and inner panes. the sun shading coating includes, starting from the outer pane toward the inner pane, a layer sequence first dielectric module M1, first silver layer Ag1, second dielectric module M2, second silver layer Ag2, third dielectric module M3, third silver layer Ag3, fourth dielectric module M4, wherein the silver layers have, relative to one another, a geometrical layer thickness of 0.4<Ag1/Ag3<1.7, and Ag3 or Ag2 is the thickest silver layer, and wherein the dielectric modules have, relative to
(Continued)

one another, an optical layer thickness of $M2/M1 \geq 1.9$, $M2/M3 \geq 0.8$, and $M2/M4 \geq 1.6$.

20 Claims, 3 Drawing Sheets

(52) U.S. Cl.
CPC ..... *B32B 2255/205* (2013.01); *B32B 2255/28* (2013.01); *B32B 2307/202* (2013.01); *B32B 2307/204* (2013.01); *B32B 2307/306* (2013.01); *B32B 2307/418* (2013.01); *B32B 2307/7376* (2023.05); *B32B 2311/08* (2013.01); *B32B 2605/00* (2013.01)

(56) References Cited

U.S. PATENT DOCUMENTS

| | | | |
|---|---|---|---|
| 9,709,717 | B2 | 7/2017 | Hevesi et al. |
| 10,618,252 | B2 | 4/2020 | Wagner et al. |
| 2004/0028953 | A1* | 2/2004 | Kraemling ........ B32B 17/10036 428/697 |
| 2014/0237917 | A1 | 8/2014 | Theios et al. |
| 2015/0321950 | A1* | 11/2015 | Fischer ............... C03C 17/3636 174/258 |
| 2016/0039713 | A1* | 2/2016 | Lemmer ................. E06B 3/66 428/34 |
| 2016/0273265 | A1 | 9/2016 | Myli et al. |
| 2020/0020765 | A1 | 1/2020 | Mori et al. |
| 2021/0107258 | A1* | 4/2021 | Horie ..................... B32B 15/01 |
| 2021/0316533 | A1 | 10/2021 | Fischer et al. |

FOREIGN PATENT DOCUMENTS

| | | |
|---|---|---|
| EP | 2 183 102 B1 | 3/2018 |
| EP | 3 623 149 A1 | 3/2020 |
| JP | H07-149545 A | 6/1995 |
| JP | 2001-039742 A | 2/2001 |
| JP | 2007-527353 A | 9/2007 |
| JP | 2020-520870 A | 7/2020 |
| JP | 2020-527124 A | 9/2020 |
| WO | WO 2005/007592 A2 | 1/2005 |
| WO | WO 2013/079400 A1 | 6/2013 |
| WO | WO 2013/127563 A1 | 9/2013 |
| WO | WO 2013/131667 A1 | 9/2013 |
| WO | WO 2018/200467 A1 | 11/2018 |
| WO | WO-2018207555 A1 * 11/2018 ............. B32B 15/01 |
| WO | WO 2019/110172 A1 | 6/2019 |
| WO | WO 2020/094423 A1 | 5/2020 |

OTHER PUBLICATIONS

Dobrowolski, J.A. (eds. Bass et al.), "Optical Properties of Films and Coatings", Handbook of Optics, vol. 1: Fundamentals, Techniques, and Design, (1995); p. 42.3-42.130.*
International Search Report as issued in International Patent Application No. PCT/EP2021/082646, dated Dec. 23, 2021.
Japanese Office Action issued in Japanese Patent Application No. 2023-532170, dated May 28, 2024.

* cited by examiner

COMPOSITE PANE COMPRISING A SUN SHADING COATING

CROSS-REFERENCE TO RELATED APPLICATIONS

This application is the U.S. National Stage of PCT/EP2021/082646, filed Nov. 23, 2021, which in turn claims priority to European patent application number 20210317.2 filed Nov. 27, 2020. The content of these applications are incorporated herein by reference in their entireties.

The invention relates to a composite pane having an improved sun shading coating and use thereof.

DE 19927683 C1 discloses a generic composite pane having at least two glass panes with a transparent intermediate layer joining them and is, furthermore, provided with a sun shading layer that substantially reflects solar radiation, in particular infrared rays outside the visible spectrum of solar radiation, in particular infrared radiation, wherein the composite glass pane is additionally provided, on its surface facing an interior space, with another transparent coating (also referred to as low-E layer) substantially reflecting thermal radiation and spatially separated from the sun shading layer.

WO2013/127563 A1 discloses another generic composite pane having a sun shading layer between the glass panes and a low-E coating on the interior-side surface. The thermal-radiation-reflecting coating (low-E coating) is based on niobium, tantalum, molybdenum, or zirconium.

WO2019/110172 A1 discloses a composite glass pane with an outer pane having an exterior-side surface and an interior-side surface, an inner pane having an exterior-side surface and an interior-side surface, and a thermoplastic intermediate layer that joins the interior-side surface of the outer pane to the exterior-side surface of the inner pane, wherein the composite pane has, between the outer pane and the inner pane, at least one sun shading coating, which substantially reflects or absorbs rays outside the visible spectrum of solar radiation, in particular infrared radiation, and wherein the composite glass pane has, on the interior-side surface of the inner pane, a thermal-radiation-reflecting coating. The composite pane has a transmittance index A of 0.02 to 0.08, with the transmittance index A determined as follows:

$$A = \frac{TL_{VSG}}{TL_{LowE} \cdot TE}$$

TL is the light transmittance level and TE is the energy transmittance, each measured according to ISO 9050. $TL_{VSG}$ refers to the light transmittance through the entire composite pane, while $TL_{LowE}$ describes only the light transmittance through the inner pane plus the infrared-reflecting low-E coating. The TL values can be suitably adjusted by the selection of the tinting of the components of the composite pane, i.e., the inner pane, the outer pane, and the intermediate layer. The TE value is likewise determined by the selection of the tinting of the components of the composite pane and, in addition, by the properties of the sun shading coating and the thermal-radiation-reflecting coating. With such a composite pane, it was possible to achieve low TTS values of less than 50%, in combination with low light transmittance of 1 to 12%.

DE 20 2020100793 U1 discloses a vehicle roof panel with an interference coating for preventing reflections on display devices. The interference coating comprises a plurality of electrically conductive silver layers, with dielectric layer structures situated between the silver layers and above and below the silver layers. Each of the dielectric layer structures comprises n optically low-refractive-index layers with a refractive index of less than 1.8 and (n+1) optically high-refractive-index layers, where n is an integer greater than or equal to 1.

WO 2020/094423A1 describes a projection arrangement for a head-up display (HUD) that comprises a composite pane with an electrically conductive coating and a projector, wherein the electrically conductive coating includes at least three electrically conductive layers, with the sum of the thicknesses of all the electrically conductive layers being at most 30 nm and with the electrically conductive layers having a thickness of 5 nm to 10 nm.

The object of the present invention consists in providing a further improved composite pane having a sun shading function, wherein the energy, thermal, and optical properties of the composite pane should be further improved and a reflection color should be achieved that is visually appealing and is as independent as possible from the viewing angle.

This object is accomplished according to the invention by a composite pane according to the independent claim 1. Advantageous embodiments of the invention are apparent from the subclaims.

The composite pane according to the invention comprises an outer pane having an exterior-side surface (side I) and an interior-side surface (side II), an inner pane having an outer surface (side III) and an interior-side surface (side IV), and a thermoplastic intermediate layer that joins the interior-side surface of the outer pane to the exterior-side surface of the inner pane, wherein the composite pane has, between the outer pane and the inner pane, at least one sun shading coating that substantially reflects or absorbs rays outside the visible spectrum of solar radiation, in particular infrared radiation, wherein the sun shading coating viewed from the direction of the outer pane includes a layer sequence first dielectric module (M1),
first silver layer (Ag1),
second dielectric module (M2),
second silver layer (Ag2),
third dielectric module (M3),
third silver layer (Ag3),
fourth dielectric module (M4).

The silver layers (Ag1, Ag2, Ag3) of the sun shading coating according to the invention have, relative to one another, a geometrical layer thickness of 0.4<Ag1/Ag3<1.7, wherein Ag3 or Ag2 is the silver layer with the greatest thickness and wherein the thickness of the silver layers Ag3 and Ag2 can also be the same. The dielectric modules (M1, M2, M3, M4) have, relative to one another, an optical layer thickness of M2/M1≥1.9, M2/M3≥0.8, and M2/M4≥1.6. All dielectric layers of the dielectric modules (M1, M2, M3, M4) have a refractive index greater than 1.8.

The structure of the layer sequence of the sun shading coating according to the invention is viewed starting from the direction of the outer pane. This means that the first dielectric module is the layer of the sun shading coating nearest the interior-side surface (side II) of the outer pane and is followed by, in this order, the first silver layer (Ag1), the second dielectric module (M2), the second silver layer (Ag2), the third dielectric module (M3), the third silver layer (Ag3), and the fourth dielectric module (M4). The fourth dielectric module is thus the layer of the sun shading coating farthest from the interior-side surface of the outer pane and nearest the exterior-side surface (side III) of the inner pane.

The silver layers are in each case arranged between dielectric modules, i.e., dielectric layers or layer sequences. The sun shading coating is arranged between the interior-side surface (side II) of the outer pane and the exterior-side surface (side III) of the inner pane and can, for example, be applied to one of the surfaces of the pane or integrated in the thermoplastic intermediate layer.

In other words, provision is made according to the invention for the layer thickness of the first silver layer (Ag1) of the sun shading coating to be less than the respective layer thickness of one or both of the following two other silver layers Ag2 and Ag3, which are arranged in the layer sequence of the sun shading coating above the first silver layer and thus farther from the outer pane. At least two of the layer thicknesses of the silver layers Ag1, Ag2, and Ag3 are thus different from one another. In this context, "different from one another" means that the layer thickness of at least two of the three silver layers differs from one another, preferably by at least 5%, particularly preferably by at least 10%, in particular by at least 15% from one another. In addition, provision is made for the layer thickness of the second dielectric module M2 to be greater in each case than the layer thickness of the other dielectric modules M1 and M4. The second dielectric module M2 or the third dielectric module M3 is the module with the greatest layer thickness, with the possibility for both modules M2 and M3 to also have the same layer thickness.

Surprisingly, it has been shown that such a composite glass pane according to the invention has, compared to the previously known composite glass panes with sun shading coating, significantly improved energy properties and, at the same time, good optical and aesthetic properties; in particular, undesirable color tones in the reflection of the composite pane can be minimized or even avoided. In addition to a visually appealing reflection color itself, the smallest possible angle-dependent change in the reflection color is also crucial for high customer acceptance. The composite pane according to the invention shows only slight angle-dependence of the reflection color.

The composite pane comprises an outer pane and an inner pane, joined to one another via a thermoplastic intermediate layer. The composite pane is intended, in a window opening, in particular the window opening of a vehicle, to separate the interior from the external surroundings. In the context of the invention, "inner pane" refers to the pane of the composite pane facing the interior (in particular, the vehicle interior). "Outer pane" refers to the pane facing the external surroundings.

The composite pane has an upper edge and a lower edge as well as two side edges extending therebetween. The term "upper edge" refers to that edge which is intended, in the installed position, to point upward. The term "lower edge" refers to that edge which is intended, in the installed position, to point downward. In the case of a windshield, the upper edge is often also referred to as the "roof edge" and the lower edge as the "engine edge". When the composite pane is used as a roof panel of a motor vehicle, the two side edges run substantially parallel to one another above the side doors of the vehicle in each case. The upper edge or lower edge of the composite pane thus faces the windshield and the remaining upper edge or lower edge is oriented toward the rear window.

The outer pane and the inner pane have, in each case, an exterior-side and an interior-side surface and a circumferential side edge running therebetween. In the context of the invention, "exterior-side surface" refers to that primary surface intended to face the external surroundings in the installed position. In the context of the invention, "interior-side surface" refers to that primary surface intended to face the interior in the installed position. The interior-side surface of the outer pane and the exterior-side surface of the inner pane face each other and are joined to one another by the thermoplastic intermediate layer.

The sun shading coating of the composite pane according to the invention is preferably applied to one of the surfaces of the two panes facing the intermediate layer, i.e., the interior-side surface of the outer pane or the exterior-side surface of the inner pane. Alternatively, the sun shading coating can also be arranged within the thermoplastic intermediate layer, for example, applied on a carrier film that is arranged between two thermoplastic bonding films. The sun shading coating is preferably provided as an IR-reflecting coating. In particular, the coating is applied over the entire surface of the pane with the exception of a circumferential edge region and optionally a local region which, as communication, sensor, or camera windows, are intended to ensure transmission of electromagnetic radiation through the composite pane and, consequently, are not provided with the coating. The circumferential uncoated edge region has, for example, a width of up to 20 cm. It prevents direct contact of the coating with the surrounding atmosphere such that the coating is protected, in the interior of the composite pane, against corrosion and damage.

When the composite pane is a windshield, the sun shading coating must be implemented as a transparent coating. A coating is considered to be a "transparent coating" when it has average transmittance in the visible spectral range of at least 70%, preferably at least 75%, i.e., does not substantially restrict vision through the pane. Preferably, at least 80% of the pane surface is provided with the coating according to the invention.

If a first layer is arranged above a second layer, this means, in the context of the invention, that the first layer is arranged farther from the outer pane than the second layer. If a first layer is arranged below a second layer, this means, in the context of the invention, that the second layer is arranged farther from the outer pane than the first layer.

If a layer is based on a material, the layer consists for the most part of this material, in particular essentially of this material, in addition to any impurities or dopants.

The sun shading coating is a layer stack or a layer sequence, in particular composed of thin layers, comprising multiple silver layers, with each silver layer arranged, in each case, between two dielectric layers or layer sequences. These dielectric layers or layer sequences are referred to as dielectric modules. The term "a dielectric module" thus means a dielectric layer which can be formed from a single ply, i.e., a single dielectric layer, or from multiple plies of dielectric layers. The coating is thus a thin layer stack with n silver layers and (n+1) dielectric layers or layer sequences, where n is a natural number and where a silver layer and a dielectric layer or layer sequence alternatingly follow a lower dielectric layer or layer sequence.

The sun shading coating is a thin layer stack, i.e., a layer sequence of thin individual layers, and preferably comprises at least four dielectric modules (M1, M2, M3, and M4), i.e., at least four dielectric layers. Each functional silver layer is arranged between two dielectric layers or layer sequences. The functional layers or layer sequences and the dielectric layers are arranged such that at least one dielectric layer is arranged in each case between two adjacent functional silver layers, between which no other functional silver layer is arranged, and that at least one other dielectric layer is arranged above the uppermost functional layer; and that at least one other dielectric layer is arranged below the lowest functional layer.

The sun shading coating according to the invention has at least three silver layers. Said natural number n is thus at least 3. The coating comprises at least the following layers or layer sequences, which are arranged in the order indicated starting from the outer pane to the inner pane:

a first dielectric layer or layer sequence as module M1,
a first silver layer Ag1,
a second dielectric layer or layer sequence as module M2,
a second silver layer Ag2,
a third dielectric layer or layer sequence as module M3,
a third silver layer Ag3, and
a fourth dielectric layer or layer sequence as module M4.

The coating according to the invention can include further silver layers and dielectric modules, which are arranged above the fourth dielectric module M4 (n>3). In a particularly preferred embodiment, said natural number is, however, exactly 3. More complex layer structures are, in principle, not necessary to achieve the required specifications of the coatings. In addition to the silver layers, however, other metal-containing layers can be present, which do not contribute significantly to the sun shading properties of the coating, but serve a different purpose. This is true in particular for metallic blocking layers with geometrical thicknesses of less than 1 nm, which are preferably arranged between the silver layer and the dielectric modules.

The silver layers give the sun shading coating the basic IR-reflecting effect. In this context, the term "silver layer" designates a layer formed on the basis of silver. The silver layers are based on silver. The silver layers preferably contain at least 90 wt.-% silver, particularly preferably at least 99 wt.-% silver, most particularly preferably at least 99.9 wt.-% silver. The silver layers can have dopants, for example, palladium, gold, copper, or aluminum.

In a preferred embodiment of the sun shading coating according to the invention, the first silver layer Ag1 and the third silver layer Ag3 have a geometrical layer thickness relative to one another of 0.6<Ag1/Ag3<1.7, while the second silver layer Ag2 is the thickest silver layer. The dielectric modules M1, M2, M3, and M4 have an optical layer thickness relative to one another of M2/M1≥2, M2/M3>1, and M2/M4≥2, with the second dielectric module M2 being the dielectric module with the greatest layer thickness. This embodiment has proved to be particularly advantageous in terms of a further improved angle-dependent change in the reflection color of the composite pane.

The optical thickness is the product of the geometrical thickness and the refractive index (at 550 nm). The optical thickness of a layer sequence is calculated as the sum of the optical thicknesses of the individual layers.

In another preferred embodiment of the sun shading coating according to the invention, the third silver layer is the silver layer with the greatest layer thickness, with the first silver layer Ag1, the second silver layer Ag2, and the third silver layer Ag3 having a geometrical layer thickness of 0.4<Ag1/Ag3<0.9 and 0.5<Ag2/Ag3<1.0 relative to one another. In this case, the first dielectric module M1, the second dielectric module M2, the third dielectric module M3, and the fourth dielectric module M4 have an optical layer thickness relative to one another of M2/M1≥1.9, M2/M3≥0.8, and M2/M≥21.6. A composite pane with this configuration of the sun shading coating shows further improved energy reflection.

According to the invention, all dielectric layers have a refractive index greater than 1.8, preferably greater than 1.9.

In other words, all dielectric layers or layer sequences of the dielectric modules are formed exclusively by dielectric layers with a refractive index greater than 1.8. Thus, good results are obtained. The dielectric layers can, for example, be based on silicon nitride, mixed silicon-metal nitrides (such as silicon-zirconium nitride (SiZrN), mixed silicon-aluminum nitride, mixed silicon-hafnium nitride, or mixed silicon-titanium nitride), aluminum nitride (AlN), tin oxide (SnO), manganese oxide (MnO), tungsten oxide ($WO_3$), niobium oxide ($Nb_2O_5$), bismuth oxide ($Bi_2O_3$), titanium dioxide ($TiO_2$), zinc oxide (ZnO), or mixed tin-zinc oxide (SnZnO).

In the context of the present invention, refractive indices are, in principle, indicated in relation to a wavelength of 550 nm. The refractive index can, for example, be determined by ellipsometry. Ellipsometers are commercially available, for example, from the company Sentech. The refractive index of a dielectric layer is preferably determined by first depositing it on a substrate as a single layer and then measuring the refractive index by ellipsometry. To determine the refractive index of a dielectric layer sequence, the layers of the layer sequence are in each case deposited alone as single layers on a substrate, and then the refractive index is determined by ellipsometery. According to the invention, a refractive index of at least 1.8 must be achieved for each of these individual layers. Dielectric layers with a refractive index of at least 1.8 as well as methods for their deposition are known to the person skilled in the art in the field of thin films. Preferably, methods of physical vapor deposition, in particular magnetron sputtering, are used.

The materials mentioned in the present description can be deposited stoichiometrically, substoichiometrically, or superstoichiometrically. The materials can have dopants, in particular aluminum, boron, zirconium, or titanium. By means of the dopants, inherently dielectric materials can be provided with a certain electrical conductivity. The person skilled in the art will nevertheless identify them in terms of their function as dielectric layers, as is customary in the field of thin layers. The material of the dielectric layers preferably has electrical conductivity (reciprocal of the specific resistance) of less than $10^{-4}$ S/m. The material of the silver layers preferably has electrical conductivity greater than $10^4$ S/m.

Preferably, the first dielectric module, the second dielectric module, the third dielectric module, and/or the fourth dielectric module include a dielectric layer acting as an antireflection layer. In an advantageous embodiment, each dielectric module includes a dielectric layer as an antireflection layer. The antireflection layers reduce the reflection of visible light and thus increase the transparency of the coated pane. The antireflection layers are, for example, based on silicon nitride ($Si_3N_4$), silicon oxide ($SiO_2$), silicon oxynitrides, mixed silicon-metal nitrides such as silicon-zirconium nitride (SiZrN), aluminum nitride (AlN), or tin oxide (SnO). In addition, the antireflection layers can have dopants. The antireflection layers preferably have geometrical thicknesses of 5 nm to 100 nm, particularly preferably of 10 nm to 60 nm. Silicon nitrides are particularly preferred as antireflection layers, since they have a higher refractive index, compared to the oxides, as a result of which a comparatively lower silicon nitride layer thickness is required. Furthermore, good color properties of the coating are achieved.

In an advantageous embodiment, one or more dielectric modules has/have a first matching layer, preferably at least each dielectric module that is arranged below a silver layer. The first matching layer is preferably arranged above the antireflection layer. The first matching layer is preferably arranged directly below the first silver layer such that it makes direct contact with the respective silver layer. This is particularly advantageous with regard to the crystallinity of the silver layer. In an advantageous embodiment, one or more dielectric modules, preferably each dielectric module, has/have a second matching layer that is arranged above a silver layer. The second matching layer is preferably arranged below the antireflection layer.

The first matching layer and/or the second matching layer preferably contains zinc oxide ZnO. The first matching layer and/or the second matching layer also preferably contains dopants. The first matching layer and/or the second matching layer can contain, for example, aluminum-doped zinc oxide (ZnO:Al). The zinc oxide is preferably deposited substoichiometrically with respect to oxygen in order to avoid a reaction of excess oxygen with the silver-containing layer. The geometrical layer thicknesses of the first matching layer and the second matching layer are preferably from 5 nm to 20 nm, particularly preferably from 8 nm to 20 nm. Zinc oxide has, due to its good smoothing properties, proved to be a preferred material for the matching layers, by which means advantageously high conductivity of the adjacent silver layer can be achieved.

In an advantageous embodiment, one or more dielectric modules has/have at least one dielectric layer as a smoothing layer, preferably each dielectric module that is arranged between two silver layers, particularly preferably also the lowest first dielectric module. The at least one smoothing layer is arranged below the first matching layers, preferably between the antireflection layer and the first matching layer, if there is such a first matching layer. The smoothing layer is particularly preferably in direct contact with the first matching layer. The smoothing layer has the effect of optimizing, in particular smoothing, the surface for a silver layer subsequently applied above. A silver layer deposited on a smoother surface has higher transmittance with, at the same time, lower sheet resistance. The geometrical layer thickness of a smoothing layer is preferably from 5 nm to 20 nm, particularly preferably from 5 nm to 12 nm. The smoothing layer preferably has a refractive index of less than 2.2.

The smoothing layer contains at least one non-crystalline oxide. The oxide can be amorphous or partially amorphous (and thus partially crystalline), but is not fully crystalline. The non-crystalline smoothing layer has low roughness and thus forms an advantageously smooth surface for the layers to be applied above the smoothing layer. The non-crystalline smoothing layer further brings about an improved surface structure of the layer deposited directly above the smoothing layer, which is preferably the first matching layer. The smoothing layer can, for example, contain at least one oxide of one or more of the elements tin, silicon, titanium, zirconium, hafnium, zinc, gallium, and indium. The smoothing layer preferably contains a noncrystalline mixed oxide. Most particularly preferably, the smoothing layer contain a mixed tin-zinc oxide (ZnSnO). The mixed oxide can have dopants. The smoothing layer can, for example, contain an antimony-doped mixed tin-zinc oxide. The mixed oxide preferably has a substoichiometric oxygen content.

In an advantageous embodiment, the sun shading coating includes one or more blocking layers. Preferably, at least one blocking layer is associated with at least one, particularly preferably with each silver layer. The blocking layer is in direct contact with the silver layer and is arranged immediately above or immediately below the silver layer. I.e., no other layer is arranged between the silver layer and the associated blocking layer. A blocking layer can, in each case, also be arranged immediately above and immediately below a silver layer. The blocking layer preferably contains niobium, titanium, nickel, chromium, and/or alloys thereof, particularly preferably nickel-chromium alloys. The geometrical layer thickness of the blocking layer is preferably from 0.1 nm to 1.5 nm, particularly preferably from 0.1 nm to 1.0 nm. A blocking layer immediately below a silver layer serves in particular to stabilize the silver layer during a temperature treatment and improves the optical quality of the sun shading coating. A blocking layer immediately above a silver layer prevents contact of the sensitive silver layer with the oxidizing reactive atmosphere during the deposition of the following layer by reactive cathodic sputtering, for example, of the second matching layer.

If a layer is based on a material, the layer consists for the most part of this material, in addition to any impurities or dopants. If a first layer is arranged above a second layer, this means, in the context of the invention, that the first layer is arranged farther from the substrate on which the coating is applied than the second layer. If a first layer is arranged below a second layer, this means, in the context of the invention, that the second layer is arranged farther from the substrate than the first layer. If a first layer is arranged above or below a second layer, this does not necessarily mean, in the context of the invention, that the first and the second layer are situated in direct contact with one another. One or more other layer can be arranged between the first and second layer, unless this is explicitly ruled out.

In an advantageous embodiment, in each case, between two adjacent silver layers, a dielectric module comprising the following dielectric layer sequence is arranged:
  an antireflection layer based on silicon nitride, mixed silicon-metal nitrides such as silicon-zirconium nitride, aluminum nitride, and/or tin oxide,
  a smoothing layer based on an oxide of one or more of the elements tin, silicon, titanium, zirconium, hafnium, zinc, gallium, and indium,
  a first and a second matching layer based on zinc oxide, and
  optionally, a blocking layer based on niobium, titanium, nickel, chromium, and/or alloys thereof. A specific order of the layers is not required. An antireflection layer and a matching layer based on the above-mentioned preferred materials are preferably arranged below the lowest silver layer and above the uppermost silver layer.

According to the invention, the dielectric modules preferably have, in each case, a geometrical thickness from 10 nm to 100 nm, particularly preferably from 20 nm to 90 nm, for example, between 70 nm and 85 nm. The optical thickness of the modules is obtained by multiplying the geometrical thickness of the dielectric modules by the refractive index of the respective layers. The optical thickness of the dielectric modules is between 40 nm and 240 nm, preferably between 50 nm and 200 nm.

The geometrical thickness of each functional silver layer of the sun shading coating is preferably from 5 nm to 25 nm, particularly preferably from 8 nm to 20 nm. The geometrical total layer thickness of all functional silver layers of the sun shading coating is preferably from 20 nm to 80 nm, particularly preferably from 30 nm to 60 nm. In these ranges for the thickness of the functional layer and the total thickness of all functional silver layers, particularly good results are achieved in terms of the sun shading function and transparency.

The sun shading coating according to the invention has IR-reflecting properties such that it functions as a sun shading coating that reduces the heating of the vehicle interior by reflecting thermal radiation. The TTS value of the composite pane provided with the coating is preferably less than 50%, particularly preferably less than 45%. TTS value refers to the total solar energy transmitted, measured in accordance with ISO 13837—it is a measure of thermal comfort. The coating can also be used as a heating coating when it is electrically contacted such that a current flows through it, heating the coating.

The outer pane and the inner pane are preferably made of glass, in particular soda lime glass, which is common for window panes. However, the panes can, in principle, also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably, panes with a thickness in the range from 0.8 mm to 5 mm, preferably from 1.4 mm to 2.9 mm, for example, those with the standard thicknesses 1.6 mm or 2.1 mm, are used.

The outer pane, the inner pane, and the thermoplastic intermediate layer can be clear and colorless, but also tinted or colored. The tinting of the outer pane, the inner pane, and the thermoplastic intermediate layer is selected as a function of the desired application of the composite pane. When the composite pane is used as a windshield, high transmittance in the visible range of the light spectrum is desired and dark tinting of the components is not used. In one embodiment as a windshield of a motor vehicle, the total transmittance through the composite glass is greater than 70%, based on illuminant A.

The term "total transmittance" is based on the process for testing the light permeability of motor vehicle windows specified by ECE-R 43, Annex 3, § 9.1. The outer pane and the inner panes can, independently of one another, be non-prestressed, partially prestressed, or prestressed. If at least one of the panes is to be prestressed, this can be thermal or chemical prestressing.

In a preferred embodiment, the composite pane is intended as a roof panel of a motor vehicle, wherein at least the thermoplastic intermediate layer and the inner pane are tinted, preferably dark tinted, in particular gray tinted.

Suitable glass panes include glass panes that are known under the tradenames Planiclear® and Planilux® (clear glass, in each case), VG 10, VG20, VG40 or TSANx, TSA3+, TSA4+ from Saint-Gobain, with the glasses from the VG series gray-colored glasses and those of the TSA series green-colored glasses. In order to further improve the transparency TL of the composite pane in the visible range of light, glass panes with particularly high transparency can also be used.

The composite pane is preferably curved in one or a plurality of spatial directions, as is customary for motor vehicle panes, wherein typical radii of curvature are in the range from approx. 10 cm to approx. 40 m. The composite pane can, however, also be flat, for example, when it is intended as a pane for buses, trains, or tractors.

The interior-side surface of the outer pane and the exterior-side surface of the inner pane face one another and are bonded to one another by means of the thermoplastic intermediate layer. The thermoplastic intermediate layer is formed by one or more thermoplastic films, wherein in the resulting composite pane, it is possible that the individual films in the resulting intermediate layer can no longer be distinguished from one another. The thermoplastic films preferably contain polyvinyl butyral (PVB), ethylene vinyl acetate (EVA), polyurethane (PU), and/or mixtures thereof and/or copolymers thereof, particularly preferably polyvinyl butyral. The films are preferably based on the materials mentioned but can, however, contain other components, for example, plasticizers, colorants, IR or UV absorbers.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of the intermediate layer is preferably from 0.2 mm to 2 mm, particularly preferably from 0.3 mm to 1 mm. The individual polymer films of the intermediate layer, in particular the PVB films, preferably have a thickness of about 0.2 mm to 1 mm, for example, 0.38 mm, 0.76 mm, or 0.81 mm. Other properties of the composite glass pane can be influenced by the thickness of the films. For example, thicker PVB films provide improved sound damping, in particular when they contain an acoustically active core, increased break-in resistance of the composite glass pane, and also increased protection against ultraviolet radiation (UV protection).

According to the invention, the sun shading coating is arranged between the outer pane and the inner pane. In a preferred embodiment, the sun shading coating is applied on the interior-side surface of the outer pane (side II). In this way, the sun shading coating is protected, in the laminate of the composite pane, against weathering influences. Positioning the sun shading coating as far outward as possible, i.e., as close as possible to the outer face of the outer pane, is advantageous in terms of particularly good sun shading action. This is further optimized by using a clear, non-tinted outer pane.

In another possible embodiment, the sun shading coating is embedded in the thermoplastic intermediate layer. The sun shading coating can be applied on a thermoplastic film. In a preferred embodiment, the sun shading coating is applied on a carrier film that is arranged, in the production of the composite pane, for example, between two thermoplastic films that serve to form the intermediate layer. The integration of the sun shading coating via a carrier film is advantageous in terms of simple prefabrication and provision of the carrier film with sun shading coating. The film of the thermoplastic intermediate layer positioned between the sun shading coating and the outer pane is preferably clear and non-tinted. The thermoplastic intermediate layer of the composite pane contains a carrier film that has the sun shading coating above it. i.e., on the surface facing the outer pane. The carrier film preferably contains or is made of polyethylene terephthalate (PET) and has a thickness from 20 μm to 100 μm, for example, roughly 50 μm. However, the carrier film can also be made of other suitable plastics.

In another preferred embodiment, the sun shading coating is applied on the exterior-side surface III of the inner pane. In this case, the outer pane and the thermoplastic intermediate layer are preferably clear and not tinted.

In a preferred embodiment, the composite pane can have a thermal-radiation-reflecting coating, also known as a low-E coating, on the interior-side surface (side IV) of the inner pane. Such a low-E coating is particularly advantageous on the inner face of the inner pane, since, in this way, the thermal-transmission-reducing layer is directly adjacent the vehicle interior. According to the invention, the composite panes can then have particularly low total transmitted thermal radiation (TTS) of less than 14% (measured in accordance with ISO13837), while, at the same time, optimum aesthetic appearance can be achieved without undesirable color tones in the reflection of the composite pane. In particular, undesirable red and yellow reflections or hazing of the composite pane can be avoided.

Such coatings are known, for example, from WO2013/131667A1. The thermal-radiation-reflecting coating can also be referred to as a thermal protection coating, coating with low emissivity, emissivity-reducing coating, low-E coating, or low-E layer. It has the function of reflecting thermal radiation, i.e., in particular IR radiation, which has longer wavelengths than the IR component of solar radiation. At low outside temperatures, the low-E coating reflects heat back into the interior and reduces the cooling of the interior. At high outside temperatures, the low-E coating, in addition to the sun shading coating, reflects the thermal radiation of the heated composite pane outward and reduces the heating of the interior. Together with the sun shading coating according to the invention, the low-E coating reduces the emission of thermal radiation from the pane particularly effectively in the summer and reduces the emission of heat into the external environment in the winter.

According to the invention, thermal-radiation-reflecting coatings with low emissivity known to date, for example, from WO2013/127563 A1 or WO2019/110172 A1, are suitable for use in the composite pane according to the invention. It is possible, with a combination of the sun shading coating according to the invention and a low-E coating for the composite pane, to achieve light transmittance (TL) of visible light with improved energy values (TTS<14%) of 1-12%, preferably between 5% and 10%.

The thermal-radiation-reflecting coating of the composite pane preferably includes a functional layer that contains a transparent conductive oxide (TCO), preferably indium tin oxide (ITO), or tin oxide ($SnO_2$), which are [sic] arranged between dielectric layers. The dielectric layers can be formed in particular from dielectric oxides or nitrides, such as ZnO, SnZnO, AlN, $TiO_2$, $SiO_2$, or $Si_3N_4$.

However, the functional layer of the low-E coating can also contain other electrically conductive oxides, for example, fluorine-doped tin oxide ($SnO_2$:F), antimony-doped tin oxide ($SnO_2$:Sb), mixed indium zinc oxide (IZO), gallium-doped or aluminum-doped zinc oxide, niobium-doped titanium oxide, cadmium stannate, and/or zinc stannate. Particularly good results in terms of emissivity and bendability of this coating are thus achieved.

In one embodiment of the invention, the low-E coating has emissivity of at most 50%, preferably at most 30% auf. In other words, it is also preferred for the interior-side emissivity of the composite pane according to the invention to preferably be less than or equal to 50%, particularly preferably from 10% to 50%, most particularly preferably from 20% to 35%, for example, less than or equal to 30%. "Interior-side emissivity" refers to the measure indicating how much thermal radiation the pane with the low-E coating emits in the installed position compared to an ideal heat radiator (a black body) into an interior, for example, of a building or of a vehicle. In the context of the invention, "emissivity" means the normal emissivity at 283 K according to the standard EN 12898.

According to the invention, the composite glass pane has external energy reflection RE>36%, preferably RE>39%. A calculation of the energy value RE is carried out in accordance with the standard ISO 9050.

In one embodiment of the composite glass pane according to the invention, it has exterior-side reflectance (visible external reflection $RL_{ext}$) of $RL_{ext}$>8%, preferably between 10% and 22%, when using a standardized A emitter at an angle of incidence of 2°. A calculation of the optical value $RL_{ext}$ is carried out in accordance with the EN 410 standard with illuminant A.

Here, exterior-side reflectance describes the reflected portion of the incident visible radiation from the external environment.

The invention further includes a method for producing a composite pane according to the invention having a sun shading coating, comprising the following steps.
a) Applying a sun shading coating on the inner surface (II) of the outer pane, or on the outer surface (III) of the inner pane, or introducing the sun shading coating into the thermoplastic intermediate layer;
b) Producing a layer stack at least comprising, in the following order, the outer pane, the thermoplastic intermediate layer, and the inner pane, and
c) Joining the layer stack at least comprising the outer pane, the thermoplastic intermediate layer, and the inner pane to form the composite pane.

In a preferred embodiment of the method, applying a thermal protection coating on the inner surface (IV) of the inner pane is provided as a further step.

The sun shading coating can be applied before, after, or simultaneously with the application of the thermal-radiation-reflecting coating. The outer pane and the inner pane are joined to form the composite glass preferably after both the sun shading coating and the thermal protection coating have been applied.

Both the sun shading coating and the thermal protection coating can withstand high thermal loads such that they can also withstand temperature treatment or bending of the panes at temperatures typically exceeding 600° C. without damage.

The individual layers of the sun shading coating as well as the thermal-radiation-reflecting coating can be deposited by methods known per se, preferably by magnetron-enhanced cathodic sputtering and built up in the suitable layer thicknesses and layer sequences. The cathodic sputtering can be carried out in a protective gas atmosphere, for example, of argon, or in a reactive gas atmosphere, for example, by addition of oxygen or nitrogen. However, the individual layers can also be applied by other suitable methods known to the person skilled in the art, for example, vapor deposition or chemical vapor deposition.

The thermoplastic intermediate layer can be provided in the form of a thermoplastic film. However, the thermoplastic intermediate layer can also be provided in the form of multiple films, for example, two or more thermoplastic films, optionally, an additional carrier film. The application of the sun shading coating on the thermoplastic intermediate layer includes only the application of the sun shading coating on one of the films, for example, on the carrier film. During the joining of the pane to form the composite glass, the carrier film with a sun shading coating arranged thereon is preferably arranged between two thermoplastic films, with the surface of the sun shading coating facing the outer pane.

The joining of the outer pane and the inner pane via the thermoplastic intermediate layer to form the composite pane is preferably done by lamination under the action of heat, vacuum, and/or pressure. Methods known per se for producing a composite pane can be used. During lamination, the heated, flowable thermoplastic material flows around the sun shading coating such that a stable bond is established and the sun shading coating is encapsulated in the intermediate layer and protected against damage and environmental influences.

For example, so-called autoclave methods can be carried out at an elevated pressure of approx. 10 bar to 15 bar and temperatures of 130° C. to 145° C. for about 2 hours. Vacuum bag or vacuum ring methods known per se operate, for example, at about 200 mbar and 80° C. to 110° C. The outer pane, the thermoplastic intermediate layer, and the inner pane can also be pressed in a calender between at least one roller pair to form a pane. Systems of this type are known for producing panes and usually have at least one heating tunnel upstream from a pressing unit. The temperature during the pressing operation ranges, for example, from 40° C. to 150° C. Combinations of calendering and autoclaving methods have proved particularly effective in practice. Alternatively, vacuum laminators can be used. These consist of one or more heatable and evacuable chambers in which the panes are laminated within, for example, about 60 minutes at reduced pressures of 0.01 mbar to 800 mbar and temperatures from 80° C. to 170° C.

The invention further includes the use of the composite pane according to the invention having a sun shading coating and optionally a low-E coating in means of locomotion for travel on land, in the air, or on water, in particular in motor vehicles, for example, as a windshield, rear window, side window, and/or roof panel, and as a functional individual piece, and in buildings.

All standards mentioned refer to the version valid on the filing date.

The various embodiments of the invention can be implemented individually or in any combinations. In particular, the features mentioned above and to be explained in the following can be used not only in the combinations indicated, but also in other combinations or in isolation, without departing from the scope of the invention, unless exemplary embodiments and/or their features are explicitly mentioned only as alternatives or are mutually exclusive.

In the following, the invention is presented in more detail with reference to the figures. It should be noted that different aspects are described, each of which can be used individually or in combination. In other words, any aspects can be used with different embodiments of the invention unless explicitly presented as a pure alternative.

The drawings are simplified schematic representations and are not to scale. The drawings in no way restrict the invention.

They depict.

Figure 1:
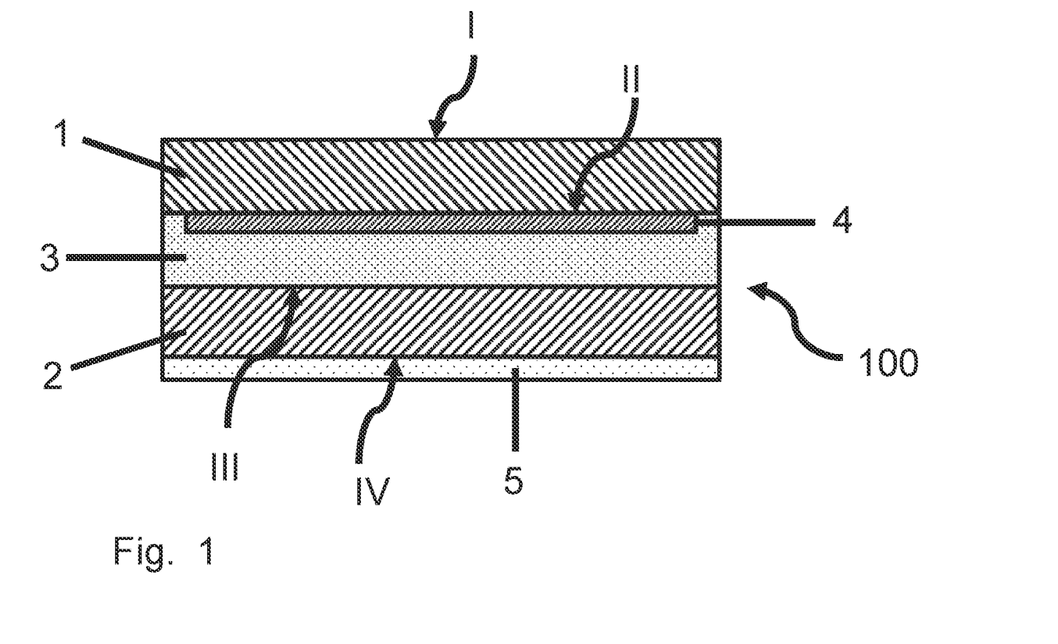
FIG. 1 a cross-section through a first embodiment of the composite pane according to the invention having a sun shading layer and a thermal-radiation-reflecting layer, FIG. 2 a cross-section through another embodiment of the composite pane according to the invention having a sun shading layer and a thermal-radiation-reflecting layer, FIG. 3 a cross-section through another embodiment of the composite pane according to the invention having a sun shading layer and a thermal-radiation-reflecting layer, FIG. 4 a schematic representation of the structure of a sun shading layer according to the invention applied on the outer pane of the composite pane, and FIG. 5 a flow chart of an embodiment of the method according to the invention.

FIG. 1 depicts a cross-section through an embodiment of the composite pane 100 according to the invention having a sun shading coating 4 and a low-E coating 5. The composite pane 100 comprises an outer pane 1 and an inner pane 2 joined to one another via a thermoplastic intermediate layer 3. The composite pane 100 can, for example, be provided as a roof panel of a passenger car, with the outer pane 1 facing the external surroundings and the inner pane 2 facing the vehicle interior. The outer pane 1 has an outer surface (I) and an inner surface (II). The inner pane 2 has an outer surface (III) and an inner surface (IV). The outer surfaces (I) and (III) face the external surroundings; the inner surfaces (II) and (IV) face the vehicle interior. The inner surface (II) of the outer pane 1 and the outer surface (III) of the inner pane 2 face one another. In this embodiment, a sun shading coating 4 according to the invention is arranged on the inner surface (II) of the outer pane 1. The sun shading coating 4 extends over the entire inner surface (II), preferably minus a circumferential frame-shaped coating-free region, for example, with a width of 8 mm. The coating-free region can then be hermetically sealed by bonding to the thermoplastic intermediate layer 3. The sun shading coating 4 is thus advantageously protected against damage and corrosion. According to the invention, the sun shading coating 4 comprises at least three functional silver layers, each of which has a layer thickness between 5 nm and 20 nm, with each functional silver layer being arranged between dielectric modules, for example, layers of silicon nitride. The silver layers (Ag1, Ag2, Ag3) of the sun shading coating according to the invention have a geometrical layer thickness relative to one another of $0.4 < Ag1/Ag3 < 1.7$, with Ag2 or Ag3 being the thickest silver layer, and the dielectric modules (M1, M2, M3, M4) have an optical layer thickness relative to one another of $M2/M1 \geq 1.9$, $M2/M3 \geq 0.8$, and $M2/M4 \geq 1.6$. The structure of the sun shading coating 4 according to the invention is described in more detail below with FIG. 4 and the examples and comparative examples explained there. The sun shading coating 4 results in reduced heating of the vehicle interior and of the inner pane 2 due to the reflection of infrared radiation. According to the invention, energy reflection RE>36%, preferably >39% can be achieved. Also, in addition to good improved thermal comfort compared to previously known systems, with the sun shading coating 4 according to the invention, good optical and aesthetic properties of the composite pane 100 are achieved at the same time. A thermal protection coating 5 is optionally arranged on the inner surface (IV) of the inner pane 2. In this preferred embodiment, it is possible for the composite pane to have not only good energy reflection RE>40%, but also particularly low total transmitted thermal radiation of TTS<14%. On the one hand, the thermal protection coating 5 reduces the emission of thermal radiation through the composite pane 100 into the vehicle interior, in particular when outside temperatures are high. On the other hand, the thermal protection coating 5 can reduce the emission of thermal radiation out of the vehicle interior when outside temperatures are low, in addition, the thermal protection coating 5 can reduce the transmittance of visible light into the vehicle interior. These are major advantages of the composite pane according to the invention, since the interior climate of the vehicle is significantly improved and the need for the use of air conditioning systems is reduced. In terms of the energy properties, in particular to achieve energy reflection RE>36 and the lowest possible TTS value of the resulting composite pane 100, it is preferred according to the invention to apply the sun shading coating 4 on a clear, non-tinted glass pane (inner side II of the outer pane 1). On the other hand, optionally, in order to neutralize, or improve, the external appearance of the composite pane 100, it can be useful for the sun shading coating 4 to be applied on a tinted glass pane (outer pane 1). Such a configuration of the composite pane according to the invention with a clear untinted outer pane, a tinted thermoplastic intermediate layer, and a tinted inner pane is, in particular, suitable as a roof panel of a vehicle.

Figure 2:
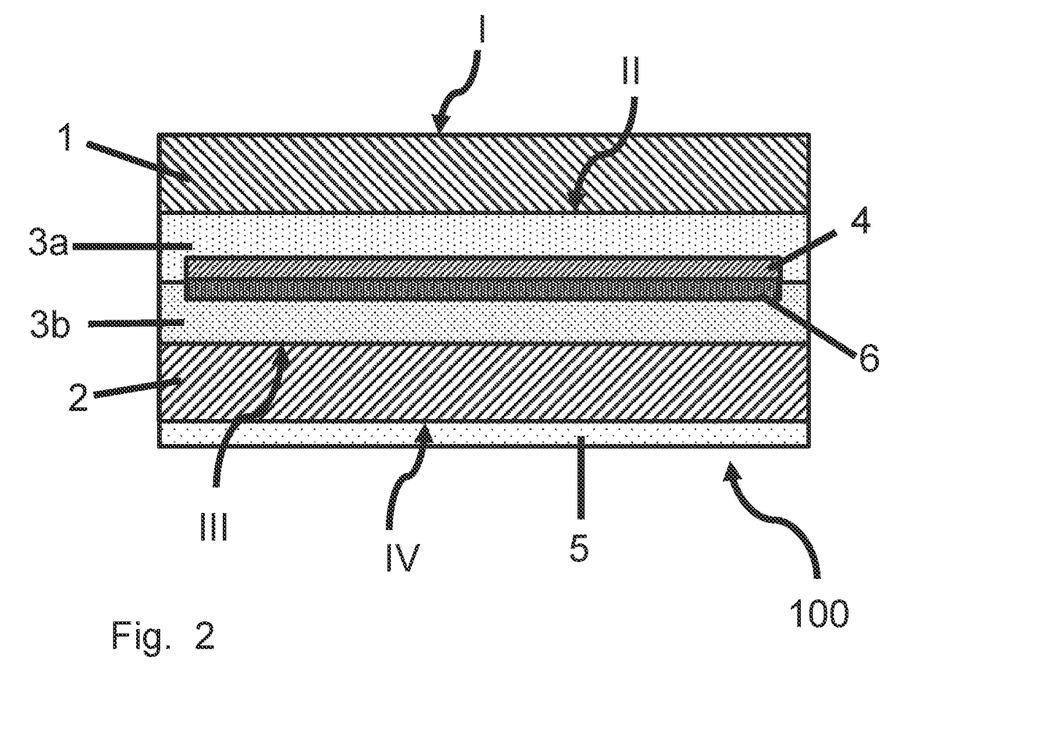

FIG. 2 depicts a cross-section through another embodiment of the composite pane 100 according to the invention having a sun shading coating and a thermal protection coating 4, 5. In contrast to FIG. 1, the sun shading coating 4 is arranged not on the inner surface (II) of the outer pane 1, but on a carrier film 6 in the intermediate layer 3. The sun shading coating 4 can optionally be arranged on the surface of the carrier film facing the inner pane 2 or the outer pane 1, with, in each case, the thickness ratios of the layers according to the invention being complied with. The carrier film 6 preferably contains or is made of polyethylene terephthalate (PET) and has, for example, a thickness of 50 μm. The sun shading layer 4 according to the invention comprises a layer structure, which is explained in greater detail with regard to FIG. 4. The carrier film 6 with the sun shading coating 4 is arranged between a first thermoplastic film 3a and a second thermoplastic film 3b. In the resulting composite pane, the thermoplastic films 3a and 3b and the carrier film 6 form the thermoplastic intermediate layer 3. The thermoplastic films 3a and 3b preferably contain or are made of PVB and have, for example, a layer thickness of 0.38 mm. The carrier film 6 is somewhat smaller than the outer pane 1, the inner pane 2, and the thermoplastic films 3a and 3b. The carrier film 6 is arranged in the composite such that the carrier film 6 does not extend all the way to the lateral edges of the composite glass. As a result, the carrier film 6 is surrounded in the edge region of the composite pane for example, circumferentially by the thermoplastic films 3a and 3b, with a width of approx. 8 mm. The sun shading coating 4 on the carrier film 6 is thus advantageously protected against damage and, in particular, corrosion. The thermal protection coating 5 on the inner surface (IV) of the inner pane 2 is designed as in FIG. 1.

Figure 3:
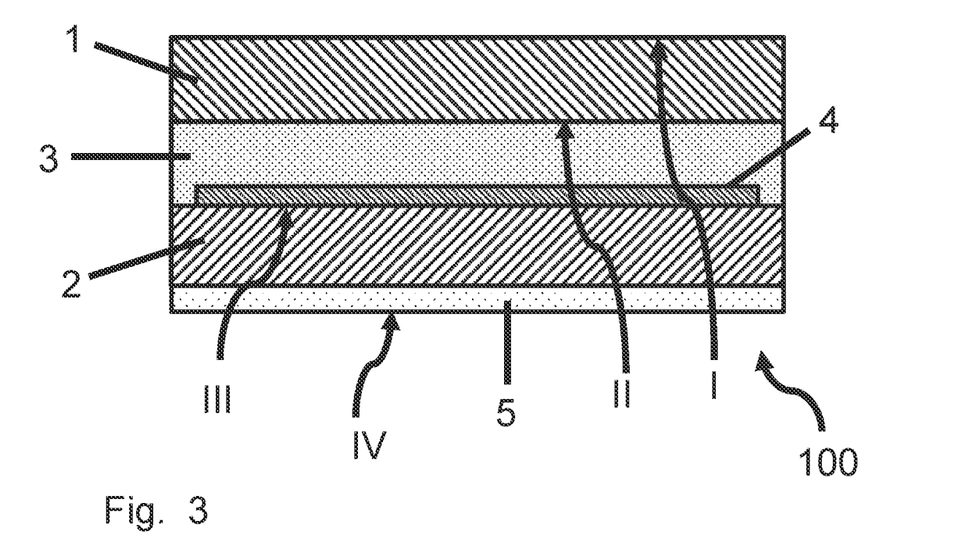

FIG. 3 depicts a cross-section through another embodiment of the composite pane 100 according to the invention having a sun shading coating and a thermal protection coating 5, 4. In contrast to FIG. 1, the sun shading coating 4 is arranged not on the inner surface (II) of the outer pane 1, but on the outer surface (III) of the inner pane 2, with a circumferential edge region of the outer surface (III) not provided with the sun shading coating 4. In this embodiment as well, the sun shading coating 4 is advantageously protected against damage and corrosion. For the rest, this embodiment corresponds to the design depicted in FIG. 1.

Figure 4:
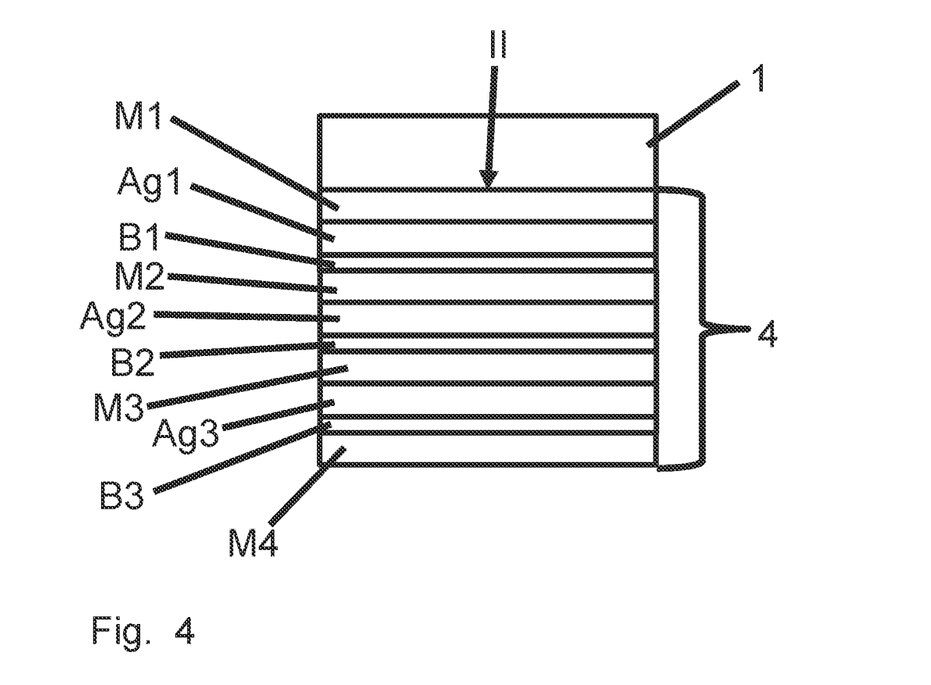

FIG. 4 depicts a schematic structure of a sun shading layer 4 according to the invention. In the embodiment depicted, the sun shading coating 4 is applied on the inner side II of the outer pane 1 as a substrate. The sun shading coating 4 depicted contains three transparent functional silver layers Ag1, Ag2, and Ag3, which are, in particular, the infrared radiation-reflecting layers. According to the invention, these functional silver layers have a certain thickness relative to one another; specifically, provision is made according to the invention for the relative geometrical layer thicknesses to have $0.4 < Ag1/Ag3 < 1.7$ and Ag3 or Ag2 to be the thickest silver layer. In other words, the layer thickness of the first silver layer Ag1, which is arranged closest to the outer pane 1, is thinner than the second silver layer Ag2 or the third silver layer Ag3 following above in the layer sequence. The silver layers can be deposited, for example, by cathodic sputtering in an argon atmosphere.

Dielectric modules M1, M2, M3, and M4 including dielectric layers are in each case arranged above, below, and between the silver layers Ag1, Ag2, and Ag3. According to the invention, these dielectric modules (M1, M2, M3, M4) have, relative to one another, an optical layer thickness $M2/M1 \geq 1.9$, $M2/M3 \geq 0.8$, and $M2/M4 \geq 1.6$. The dielectric module M1 is thus arranged below the first silver layer Ag1 directly on the inner side II of the outer pane 1; the second dielectric module M2 is arranged above the first silver layer Ag1. The first dielectric module M1 can, for example, be structured, starting from the outer pane 1, as a layer sequence of silicon nitride, ZnSnOx, and ZnO layers. The silicon nitride layer can be deposited from silicon nitride in a nitrogen-containing atmosphere; the zinc oxide layer, from zinc oxide in an oxygen-containing atmosphere.

The sun shading coating 4 contains at least one blocking layer; particularly preferably each functional silver layer Ag1, Ag2, Ag3 is situated, as depicted, in direct contact with at least one blocking layer B1, B2, and B3. According to the invention, the blocking layers preferably contain or are made of at least nickel, chromium, or alloys thereof and/or titanium chromium. The blocking layers B (B1, B2, B3) are preferably arranged between at least one functional silver layer and at least one dielectric layer. The blocking layers B protect the functional layer during heating, in particular during production of the composite pane according to the invention.

The invention is explained with reference to the following Examples according to the invention and Comparative Examples not according to the invention.

Examples

All optical, aesthetic, and energy properties of the composite panes according to the Examples and the Comparative Examples were measured in the laminated state. In the Examples and Comparative Examples, the sun shading coating 4 was applied to the inner side II of a clear outer pane 1 (Example Planiclear) in accordance with FIG. 4 and laminated with a thermoplastic intermediate layer 3 and an inner pane 2 in accordance with the structure of FIG. 1. A tinted PVB film was used in the intermediate layer. The low-E coating was applied to the inner side IV of a darkly tinted inner pane 2 (Example VG10). The low-E coating had emissivity of 30%. The low-E coating is based on an ITO (indium-tin oxide) layer that is encapsulated between dielectric layers ($Si_3N_4$, $SiO_x$). The Examples and Comparative Examples have the same basic structure described, but differ in the sun shading coatings used.

Examples 1 through 10 according to the invention and Comparative Examples not according to the invention were produced as a composite pane (windshield for a vehicle) with the sun shading coatings indicated.

For each Example and Comparative Example, the stack structure of the sun shading coating (layers and layer thicknesses) and the optical properties of the coating in the finished composite pane are indicated.

The layer sequences and layer thicknesses of the sun shading coatings in accordance with Examples 1 to 10 according to the invention are presented in Table 1a. In comparison, the Comparative Examples 1 to 4 not according to the invention are described in Table 1b. The relative layer thicknesses of the silver layers and of the dielectric modules, as well as the values of the optical and energy properties are reported for the Examples 1 to 10 according to the invention in Table 2a; and for the Comparative Examples 1 to 4 not according to the invention, in Table 2b. All layer thicknesses of the silver layers and of the layers of the modules are indicated as geometrical layer thicknesses. The relative layer thicknesses of the silver layers, indicated as thickness ratios Ag2/Ag1, Ag2/Ag3, and Ag1/Ag3 refer to the geometrical layer thicknesses. For the relative layer thicknesses of the dielectric modules, indicated as thickness ratios M2/M1, M2/M3, and M2/M4, the optical thicknesses were used.

Abbreviations

RE energy reflection [%]

TL visible light transmittance [%]

TTS total transmitted thermal radiation [%]

TE total transmitted energy [%]

RL 8° visible reflection at a viewing angle of 8° [%]

a*, b* color coordinates in the CIE color space (International Commission on Illumination), measured in each case in reflection at an angle of 60° and at an angle of 8°

Δa*, Δb* difference in the color coordinates when measured in reflection at 60° and at 8°

Color R* color impression of the external reflection color in each case in reflection at 60° and at 8° perceived by the viewer of the composite pane The values for light transmittance (TL) and reflection (RL) are based on illuminant A, i.e., the visible portion of sunlight at a wavelength of 380 nm to 780 nm.

TABLE 1a

Examples 1-10 Layer Structures of the Sun Shading Coating

| Layer sequence Outer pane 1 | Layer material | Layer Thicknesses [nm] per Example According to the Invention |  |  |  |  |  |  |  |  |  |
|---|---|---|---|---|---|---|---|---|---|---|---|
|  | Glass | #1 | #2 | #3 | #4 | #5 | #6 | #7 | #8 | #9 | #10 |
| M1 | $SiZrN_x$ | 16.1 | 15.7 | 15.7 | 16.4 | 8 | 9.8 | 7.3 | 10.6 | 9.8 | 10.8 |
|  | $ZnSnO_x$ | 8 | 8 | 8 | 8 | 8 | 8 | 7.5 | 7.5 | 7.5 | 7.7 |
|  | ZnO | 10 | 10 | 10 | 10 | 10 | 10 | 10.8 | 11 | 11 | 11.3 |
| Ag1 | Ag | 8.5 | 9.3 | 10 | 9.4 | 8 | 10.6 | 11.6 | 11.8 | 10.4 | 11.9 |
| B1 | NiCr | 0.2 | 0.2 | 0.2 | 0.2 | 0.2 | 0.2 | 0.6 | 0.6 | 0.3 | 0.1 |
| M2 | ZnO | 10 | 10 | 10 | 10 | 10 | 10 | 12.2 | 15 | 15 | 13.3 |
|  | $SiZrN_x$ | 10 | 10 | 10 | 10 | 10 | 20.3 | 16.6 | 16 | 15.5 | 16.7 |
|  | $Si_3N_4$ | 21.8 | 22.3 | 22.3 | 22.8 | 13.2 | 15 | 22.2 | 12.4 | 6.5 | 14.7 |
|  | $SiZrN_x$ | 10 | 10 | 10 | 10 | 10 | 15 | 6.2 | 10.9 | 16.5 | 17.1 |
|  | $ZnSnO_x$ | 8 | 8 | 8 | 8 | 8 | 8 | 7.5 | 9.3 | 9.3 | 8.7 |
|  | ZnO | 10 | 10 | 10 | 10 | 10 | 10 | 12.2 | 14 | 14 | 12.4 |
| Ag2 | Ag | 10.5 | 11.4 | 12 | 11.8 | 10.2 | 12 | 12.6 | 14.2 | 15 | 14.4 |
| B2 | NiCr | 0.2 | 0.2 | 0.2 | 0.2 | 0.2 | 0.2 | 0.8 | 0.8 | 0.3 | 0.1 |
| M3 | ZnO | 10 | 10 | 10 | 10 | 10 | 10 | 10.8 | 13 | 13 | 12.8 |
|  | $Si_3N_4$ | 15 | 15 | 15 | 15 | 15 | 15 | 24.4 | 5.4 | 10.5 | 14.9 |
|  | $SiZrN_x$ | 31.1 | 31.3 | 31.3 | 33.1 | 28 | 20.9 | 9.9 | 13.8 | 16.6 | 17.5 |
|  | $ZnSnO_x$ | 8 | 8 | 8 | 8 | 8 | 8 | 7.5 | 9.0 | 9 | 7.1 |
|  | ZnO | 10 | 10 | 10 | 10 | 10 | 10 | 10.8 | 13 | 13 | 12.9 |
| Ag3 | Ag | 13.3 | 13.9 | 14 | 17.6 | 15.7 | 10.3 | 10.6 | 9.7 | 9.9 | 10.4 |
| B3 | NiCr | 0.2 | 0.2 | 0.2 | 0.2 | 0.2 | 0.2 | 1.5 | 0.5 | 1.3 | 0.1 |
| M4 | ZnO | 10 | 10 | 10 | 10 | 10 | 10 | 12.2 | 15 | 15 | 15.5 |
|  | $Si_3N_4$ | 14.7 | 15.2 | 15.2 | 17 | 10.2 | 25.4 | 15.3 | 3.1 | 19.5 | 20.6 |

TABLE 1b

Comparative Examples 1-4 Layer Structures of the Sun Shading Coating

| Layer sequence | Layer material | Layer Thicknesses [nm] per Comparative Example |  |  |  |
|---|---|---|---|---|---|
|  |  | #1 | #2 | #3 | #4 |
| Outer pane 1 | Glass |  |  |  |  |
| M1 | $SiZrN_x$ | 22 | 16.4 | 9.8 | 9.8 |
|  | $ZnSnO_x$ | 8 | 8 | 8 | 8 |
|  | ZnO | 11 | 10 | 10 | 10 |
| Ag1 | Ag | 8.5 | 15 | 10.6 | 12.9 |
| B1 | NiCr | 0.2 | 0.2 | 0.2 | 0.2 |
| M2 | ZnO | 11 | 10 | 10 | 10 |
|  | $SiZrN_x$ | 10 | 10 | 8 | 14.7 |
|  | $Si_3N_4$ | 21.8 | 21.8 | 8 | 15 |
|  | $SiZrN_x$ | 10 | 10 | 8 | 15 |
|  | $ZnSnO_x$ | 8 | 8 | 8 | 8 |
|  | ZnO | 11 | 10 | 10 | 10 |
| Ag2 | Ag | 10.5 | 12 | 12.5 | 10.6 |
| B2 | NiCr | 0.2 | 0.2 | 0.2 | 0.2 |
| M3 | ZnO | 11 | 11 | 10 | 10 |
|  | $Si_3N_4$ | 15 | 15 | 15 | 15 |
|  | $SiZrN_x$ | 31.1 | 22 | 30.6 | 19 |
|  | $ZnSnO_x$ | 8 | 8 | 8 | 8 |
|  | ZnO | 11 | 10 | 10 | 10 |
| Ag3 | Ag | 13.3 | 10.5 | 11.7 | 8.9 |
| B3 | NiCr | 0.2 | 0.2 | 0.2 | 0.2 |
| M4 | ZnO | 11 | 10 | 10 | 10 |
|  | $Si_3N_4$ | 14.7 | 14.7 | 25.4 | 25 |

TABLE 2a

Examples 1-10 Thickness Ratios and Optical Properties in the Laminate

| Thickness Ratios and Optical Properties per Example | #1 | #2 | #3 | #4 | #5 | #6 | #7 | #8 | #9 | #10 |
|---|---|---|---|---|---|---|---|---|---|---|
| Thickness Ratios |  |  |  |  |  |  |  |  |  |  |
| Ag2/Ag1 | 1.23 | 1.23 | 1.20 | 1.25 | 1.27 | 1.10 | 1.10 | 1.20 | 1.40 | 1.20 |
| Ag2/Ag3 | 0.79 | 0.82 | 0.86 | 0.67 | 0.65 | 1.20 | 1.20 | 1.50 | 1.50 | 1.40 |
| Ag1/Ag3 | 0.64 | 0.67 | 0.71 | 0.53 | 0.51 | 1.00 | 1.10 | 1.20 | 1.10 | 1.10 |
| M2/M1 | 1.99 | 2.02 | 2.03 | 2.00 | 2.35 | 2.80 | 3.0 | 2.70 | 2.70 | 2.80 |
| M2/M3 | 0.92 | 0.92 | 0.93 | 0.91 | 0.85 | 1.20 | 1.20 | 1.40 | 1.30 | 1.3 |
| M2/M4 | 2.95 | 2.92 | 2.92 | 2.74 | 3.19 | 2.40 | 2.90 | 4.50 | 2.40 | 3.60 |

TABLE 2a-continued

Examples 1-10 Thickness Ratios and Optical Properties in the Laminate

Thickness Ratios and Optical Properties per Example

| | #1 | #2 | #3 | #4 | #5 | #6 | #7 | #8 | #9 | #10 |
|---|---|---|---|---|---|---|---|---|---|---|
| Optical Properties | | | | | | | | | | |
| TL | 6.2 | 6.2 | 6.1 | 5.5 | 5.6 | 6.3 | 5.2 | 5.2 | 5.40 | 6.2 |
| RL 8° | 11.7 | 12.1 | 12.0 | 18.9 | 17.4 | 11.9 | 10.7 | 12.9 | 14.0 | 13.8 |
| a*R 8° | −4.1 | −3.7 | −5.3 | −4.4 | −4.6 | −4.4 | −4.6 | −1.6 | −5.6 | −5.2 |
| b*R 8° | −10.8 | −11.5 | −11.3 | −10.6 | −6.6 | −10.8 | −10.3 | −10.5 | −8.9 | −8.5 |
| a*R 60° | −3.4 | −3.8 | −4.1 | −2.7 | −3.0 | −4.5 | −5.1 | −2.8 | −2.0 | −3.3 |
| b*R 60° | −7.5 | −6.6 | −6.0 | −8.4 | −2.7 | −7.2 | −7.5 | −6.2 | −8.4 | −8.3 |
| Color R*8° | blue | blue | blue | blue | blue | blue | blue | blue | blue | blue |
| (Color R*60° | blue | blue | blue | blue | neutral | blue | blue | blue | blue | blue |
| Δ a*R (8° vs. 60°) | 0.7 | −0.1 | 1.2 | 1.7 | 1.6 | −0.1 | −0.5 | −1.2 | 3.6 | 1.9 |
| Δ b*R (8° vs. 60°) | 3.3 | 4.9 | 5.3 | 2.2 | 4.0 | 3.6 | 2.8 | 4.3 | 0.4 | 0.2 |
| RE | 44.0 | 44.8 | 47.6 | 51.0 | 49.2 | 45.2 | 41.7 | 44.4 | 44.1 | 46.7 |
| TE | 3.0 | 2.8 | 2.7 | 2.4 | 2.4 | 3.0 | 2.7 | 2.6 | 2.8 | 3.2 |
| TTS | 13.6 | 13.3 | 12.6 | 11.7 | 12.1 | 13.4 | 13.8 | 13.2 | 13.4 | 13.4 |

TABLE 2b

Comparative Examples 1-4 Thickness Ratios and Optical Properties in the Laminate Thickness Ratios and Optical Properties per Comparative Example

| | #1 | #2 | #3 | #4 |
|---|---|---|---|---|
| Thickness Ratios | | | | |
| Ag2/Ag1 | 1.2 | 0.8 | 1.2 | 0.8 |
| Ag2/Ag3 | 0.8 | 1.1 | 1.1 | 1.2 |
| Ag1/Ag3 | 0.6 | 1.4 | 0.9 | 1.4 |
| M2/M1 | 1.7 | 2.0 | 1.9 | 2.6 |
| M2/M3 | 0.9 | 1.1 | 0.7 | 1.2 |
| M2/M4 | 2.9 | 3.0 | 1.5 | 2.2 |
| Optical Properties | | | | |
| TL | 6.1 | 6.1 | 5.7 | 6.5 |
| RL 8° | 13.3 | 11.1 | 18.9 | 9.2 |
| a*R 8° | −14.1 | 2.2 | −0.6 | −4.3 |
| b*R 8° | 2.3 | 7.2 | 0.3 | −14.1 |
| a*R 60° | −13.0 | −3.0 | 9.7 | 2.3 |
| b*R 60° | −2.9 | 9.7 | 0.6 | −8.2 |
| Color R*8° | yellow-green | orange | neutral | blue |
| Color R*60° | green | yellow | rot | violet |
| Δ a*R (8° vs. 60°) | 1.1 | −5.2 | 10.3 | 7.1 |
| Δ b*R (8° vs. 60°) | −5.2 | 2.5 | 0.3 | 6.2 |
| RE | 38.8 | 44.8 | 52.4 | 46.2 |
| TE | 3.6 | 3.1 | 2.4 | 3.0 |
| TTS | 15.3 | 13.6 | 12.7 | 13.2 |

According to the invention, composite panes having a sun shading coating structured according to the invention are provided which were successfully improved in terms of energy properties, thermal and visual comfort, and at the same time in terms of aesthetic appearance, and were further optimized compared to known composite panes having sun shading coatings. Energy reflection of RE>41%, preferably of RE>39%, was achieved. With the sun shading coating according to the invention, composite panes can be provided in conjunction with a thermal-radiation-reflecting coating, which panes can additionally have a particularly low total transmitted thermal radiation (TTS) of less than 14%, while, at the same time, achieving optimum aesthetic appearance without undesirable color tones in the reflection of the composite pane. In particular, undesirable red and yellow reflections or hazing of the composite pane can be avoided.

According to the invention, a substantially constant, desirable color reflection of the composite pane can be achieved regardless of the viewing angle.

Examples 1 to 5 according to the invention have silver layers Ag1, Ag2, and Ag3 with a relative geometrical layer thickness of 0.4<Ag1/Ag3<0.9 and 0.5<Ag2/Ag3<1.0, with Ag3 being the thickest silver layer and the dielectric modules (M1, M2, M3, M4) having an optical layer thickness of M2/M1≥1.9, M2/M3≥0.8, and M2/M4≥1.6 relative to one another. The Examples 1 to 5 have improved energy reflection.

For Examples 6 to 10 according to the invention, for the silver layers Ag1, Ag2, and Ag3, the relative geometrical layer thickness is 0.6<Ag1/Ag3<1.7, with Ag2 the thickest silver layer and the dielectric modules (M1, M2, M3, M4) having a relative optical layer thickness of M2/M1≥2, M2/M3>1, and M2/M4≥2. These composite panes are in particular advantageous in terms of the lowest possible angle-dependent color deviations Δ a in reflection.

Figure 5:
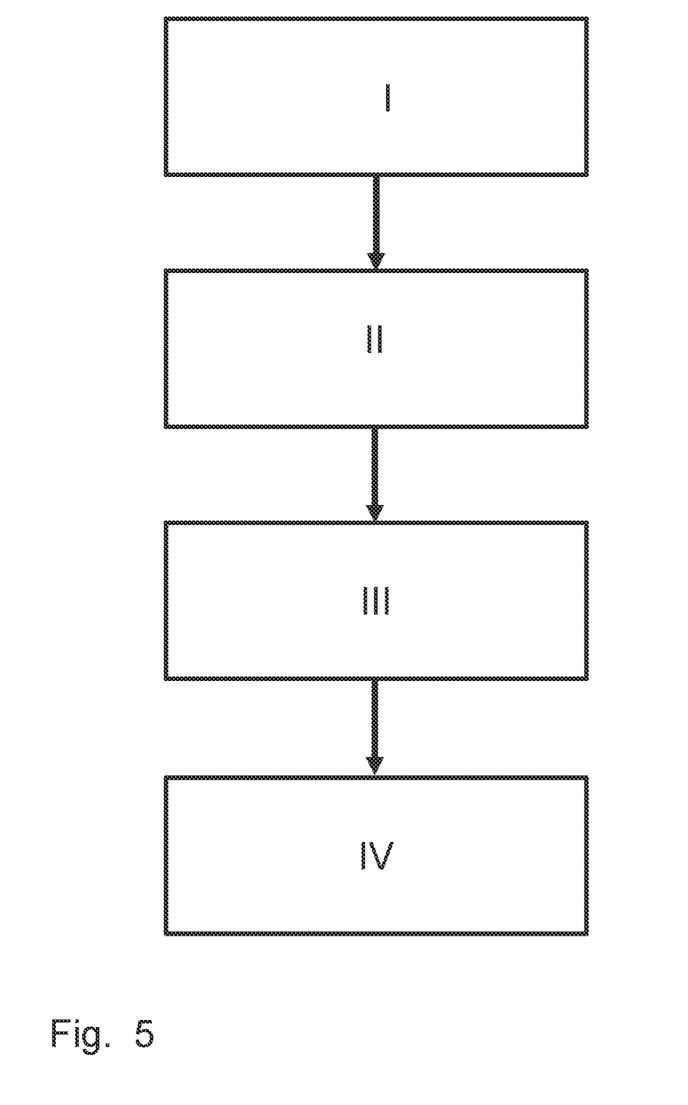

FIG. 5 depicts an exemplary embodiment of the method according to the invention referencing a flow chart comprising the following steps.

I Providing an outer pane 1, an inner pane 2, and at least one thermoplastic film to form the thermoplastic intermediate layer 3;

II Applying a sun shading coating 4 according to the invention to the inner surface II of the outer pane 1 or to the outer surface III of the inner pane 2, for example, by means of cathodic sputtering;

III Optionally applying a thermal protection coating 5 to the inner side IV of the inner pane 2;

IV Joining the inner surface II of the outer pane 1 and the outer surface III of the inner pane 2 via the thermoplastic intermediate layer 3 to form a composite pane 100.

In one embodiment, glass panes are used as the outer pane 1 and as the inner pane 2. In a preferred embodiment of the method, the sun shading coating 4 having the at least three functional silver layers Ag1, Ag 2, and Ag3 and the at least four dielectric modules M1, M2, M3, and M4 is applied on the inner side II of the outer pane 1, preferably by means of magnetron-enhanced cathodic sputtering. Temporally, the sun shading coating 4 can be applied before, after, or simultaneously with the optional application of the thermal-radiation-reflecting coating 5 on the inner side IV of the inner pane 2. The joining of the outer pane 1 and the inner pane 2 via the intermediate layer 3 to form the composite glass is preferably done after both the sun shading coating 4 and the optional thermal protection coating 5 have been applied.

LIST OF REFERENCE CHARACTERS

1 outer pane
2 inner pane
3 thermoplastic intermediate layer
3a first thermoplastic film
3b second thermoplastic film
4 sun shading coating
5 thermal protection coating
6 carrier film
I outer surface of 1
II inner surface of 1
III outer surface of 2
IV inner surface of 2
Ag1 first silver layer
Ag2 second silver layer
Ag3 third silver layer
M1 first dielectric module
M2 second dielectric module
M3 third dielectric module
M4 fourth dielectric module
B blocking layer
B1 first blocking layer
B2 second blocking layer
B3 third blocking layer

The invention claimed is:

1. A composite pane, comprising an outer pane having an exterior-side surface and an interior-side surface, an inner pane having an exterior-side surface and an interior-side surface, and a thermoplastic intermediate layer, which joins the interior-side surface of the outer pane to the exterior-side surface of the inner pane, wherein the composite pane has at least one sun shading coating between the outer pane and the inner pane, wherein the sun shading coating comprises, starting from the outer pane toward the inner pane, a layer sequence
   first dielectric module,
   first silver layer,
   second dielectric module,
   second silver layer,
   third dielectric module,
   third silver layer,
   fourth dielectric module,
   wherein the first, second and third silver layers have, relative to one another, a geometrical layer thickness of $0.4 < Ag1/Ag3 < 1.7$; and Ag3 or Ag2 is the thickest silver layer, where Ag1 is the geometrical layer thickness of the first silver layer, Ag2 is the geometrical layer thickness of the second silver layer, and Ag3 is the geometrical layer thickness of the third silver layer; and wherein the first, second, third and fourth dielectric modules have, relative to one another, an optical layer thickness of $M2/M1 > 1.9$, $M2/M3 > 0.8$, and $M2/M4 > 1.6$, where M1 is the optical layer thickness of the first dielectric module, M2 is the optical layer thickness of the second dielectric module, M3 is the optical layer thickness of the third dielectric module and M4 is the optical layer thickness of the fourth dielectric module and wherein all dielectric layers of the first, second, third and fourth dielectric modules have a refractive index greater than 1.8,
   wherein each of the second and third dielectric modules comprises at least one first dielectric layer based on silicon nitride or mixed silicon-metal nitride and at least one second dielectric layer based on metal oxide.

2. The composite pane according to claim 1, wherein the first, second and third silver layers of the sun shading coating have, relative to one another, a geometrical layer thickness of $0.6 < Ag1/Ag3 < 1.7$; Ag2 is the thickest silver layer; and the first, second, third and fourth dielectric modules have, relative to one another, an optical layer thickness of $M2/M1 \geq 2$, $M2/M3 > 1$, and $M2/M4 \geq 2$.

3. The composite pane according to claim 1, wherein the first, second and third silver layers of the sun shading coating have, relative to one another, a geometrical layer thickness of $0.4 < Ag1/Ag3 < 0.9$, and $0.5 < Ag2/Ag3 < 1.0$; Ag3 is the thickest silver layer; and the first, second, third and fourth dielectric modules have, relative to one another, an optical layer thickness of $M2/M1 \geq 1.9$, $M2/M3 \geq 0.8$, and $M2/M4 \geq 1.6$.

4. The composite pane according to claim 1, wherein the first dielectric module, the second dielectric module, the third dielectric module, and/or the fourth dielectric module have at least one dielectric layer based on silicon nitride.

5. The composite pane according to claim 1, wherein the first dielectric module, the second dielectric module, the third dielectric module, and/or the fourth dielectric module include at least one first dielectric layer based on silicon nitride and at least one second dielectric layer based on zinc oxide.

6. The composite pane according to claim 1, wherein the first dielectric module the second dielectric module, the third dielectric module, and/or the fourth dielectric module include at least one first dielectric layer based on silicon nitride, at least one second dielectric layer based on zinc oxide, and at least one third dielectric layer based on a mixed tin-zinc oxide.

7. The composite pane according to claim 1, wherein the sun shading coating includes, above and/or below the first, second and third silver layers, in each case, at least one metallic blocking layer, which has a geometrical thickness of less than 1 nm.

8. The composite pane according to claim 1, wherein the first silver layer, the second silver layer, and the third silver layer have, in each case, a geometrical thickness of 5 nm to 25 nm.

9. The composite pane according to claim 8, wherein the first silver layer, the second silver layer, and the third silver layer have, in each case, a geometrical thickness of 8 nm to 20 nm.

10. The composite pane according to claim 1, wherein the first dielectric module, the second dielectric module, the third dielectric module, and the fourth dielectric module have, in each case, a geometrical thickness of 10 nm to 100 nm.

11. The composite pane according to claim 10, wherein the first dielectric module, the second dielectric module, the third dielectric module, and the fourth dielectric module have, in each case, a geometrical thickness of 20 nm to 90 nm.

12. The composite pane according to claim 11, wherein the first dielectric module, the second dielectric module, the third dielectric module, and the fourth dielectric module have, in each case, a geometrical thickness of 70 nm to 85 nm.

13. The composite pane according to claim 1, wherein the sun shading coating is applied on the interior-side surface of the outer pane.

14. The composite pane according to claim 1, wherein a thermal-radiation-reflecting coating is applied on the interior-side surface of the inner pane.

15. The composite pane according to claim 14, wherein the thermal-radiation-reflecting layer has a functional layer based on an indium-tin oxide layer or a tin oxide layer, wherein the indium-tin oxide layer or the tin oxide layer is arranged between two dielectric layers.

16. Method A method for producing a composite pane according to claim 1 comprising:

a) applying a sun shading coating to the inner surface of the outer pane, or to the outer surface of the inner pane, or introducing the sun shading coating into a thermoplastic intermediate layer,
b) producing a layer stack comprising at least, in this order, the outer pane, the thermoplastic intermediate layer, and the inner pane, and
c) joining the layer stack comprising at least the outer pane, the thermoplastic intermediate layer, and the inner pane to form the composite pane.

17. The method for producing a composite pane according to claim 16, wherein a thermal-radiation-reflecting coating is applied to the inner surface of the inner pane.

18. A method comprising providing a composite pane according to claim 1 in a motor vehicle as a windshield, rear window, side window, and/or roof panel.

19. The method according to claim 18, wherein the composite pane is a roof panel of a motor vehicle.

20. A composite pane, comprising an outer pane having an exterior-side surface and an interior-side surface, an inner pane having an exterior-side surface and an interior-side surface, and a thermoplastic intermediate layer, which joins the interior-side surface of the outer pane to the exterior-side surface of the inner pane, wherein the composite pane has at least one sun shading coating between the outer pane and the inner pane, wherein the sun shading coating comprises, starting from the outer pane toward the inner pane, a layer sequence first dielectric module,
first silver layer,
second dielectric module,
second silver layer,
third dielectric module,
third silver layer,
fourth dielectric module,
wherein the first, second and third silver layers have, relative to one another, a geometrical layer thickness of $0.4 < Ag1/Ag3 < 1.7$; and $Ag2$ is the thickest silver layer, where $Ag1$ is the geometrical layer thickness of the first silver layer, $Ag2$ is the geometrical layer thickness of the second silver layer, and $Ag3$ is the geometrical layer thickness of the third silver layer; and wherein the first, second, third and fourth dielectric modules have, relative to one another, an optical layer thickness of $M2/M1 > 1.9$, $M2/M3 > 0.8$, and $M2/M4 > 1.6$, where $M1$ is the optical layer thickness of the first dielectric module, $M2$ is the optical layer thickness of the second dielectric module, $M3$ is the optical layer thickness of the third dielectric module and $M4$ is the optical layer thickness of the fourth dielectric module and wherein all dielectric layers of the first, second, third and fourth dielectric modules have a refractive index greater than 1.8.

* * * * *